US009706376B2

(12) United States Patent
Fletcher et al.

(10) Patent No.: US 9,706,376 B2
(45) Date of Patent: Jul. 11, 2017

(54) NAVIGATIONAL AID FOR EMERGENCY RESPONSE PERSONNEL

(71) Applicant: Avaya Inc., Santa Clara, CA (US)

(72) Inventors: Mark J. Fletcher, Ringwood, NJ (US); Paul Roller Michaelis, Louisville, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/713,142

(22) Filed: May 15, 2015

(65) Prior Publication Data

US 2016/0337829 A1 Nov. 17, 2016

(51) Int. Cl.
| H04M 11/04 | (2006.01) |
| H04W 4/22 | (2009.01) |
| H04W 4/02 | (2009.01) |
| H04W 12/06 | (2009.01) |
| H04W 4/04 | (2009.01) |
| H04W 84/12 | (2009.01) |

(52) U.S. Cl.
CPC ............ *H04W 4/22* (2013.01); *H04W 4/025* (2013.01); *H04W 4/043* (2013.01); *H04W 12/06* (2013.01); *H04W 84/12* (2013.01)

(58) Field of Classification Search
CPC ....... H04W 4/22; H04W 48/04; H04W 12/06; H04W 4/043; H04W 4/025
USPC ......... 455/404.2, 432.1, 456.1, 456.2, 456.6; 370/235, 311, 329, 336, 331
See application file for complete search history.

(56) References Cited

U.S. PATENT DOCUMENTS

| 7,395,047 | B2 | 7/2008 | Mohler | |
| 7,940,896 | B2 | 5/2011 | Prozeniuk et al. | |
| 8,913,959 | B1 * | 12/2014 | Pochop, Jr. ........... | H04W 24/02 455/41.2 |
| 8,997,164 | B2 * | 3/2015 | Gordon .............. | H04N 21/8358 725/105 |
| 9,148,408 | B1 * | 9/2015 | Glazemakers ........ | H04L 63/029 |
| 2005/0220277 | A1 * | 10/2005 | Blalock .................. | G06Q 10/10 379/45 |
| 2013/0260790 | A1 * | 10/2013 | Itzhaki .................... | H04W 4/02 455/456.1 |
| 2014/0082713 | A1 * | 3/2014 | Markel .................. | H04L 63/08 726/7 |
| 2014/0145845 | A1 * | 5/2014 | Sattari .................... | G08B 21/24 340/539.13 |

(Continued)

Primary Examiner — Dhaval Patel
(74) Attorney, Agent, or Firm — Sheridan Ross P.C.

(57) ABSTRACT

An exemplary aspect relates an emergency response system and associated technologies. More specifically, an exemplary aspect relates to first responder and associated equipment access to one or more communications systems at, for example, an emergent event(s). Still another aspect relates to access point authentication and management for certain class(es) of personnel optionally based on location information. Yet another aspect related to providing specific information based on location. One illustrative example is providing advertising information based on a location relative to an access point(s). Another example, is providing or limiting access to information on the back side of a firewall based on a device's location relative to an access point(s). Yet another example is dynamically modifying an authentication/login page to an access point based, for example, on a location.

21 Claims, 10 Drawing Sheets

(56) References Cited

U.S. PATENT DOCUMENTS

2015/0219742 A1* 8/2015 Castagnoli ............... G01S 1/08
370/336

* cited by examiner

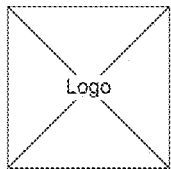
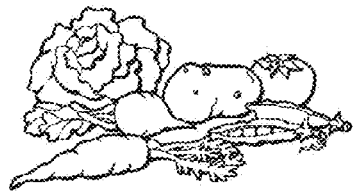
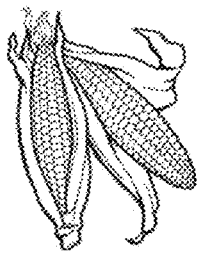
Click Here for Grocery Specials
Fig. 6  610
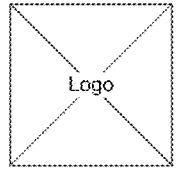
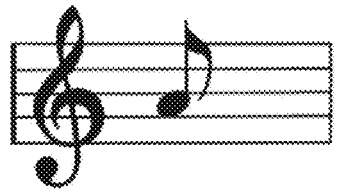
Todays Electronics and Music Specials!
Fig. 7  710

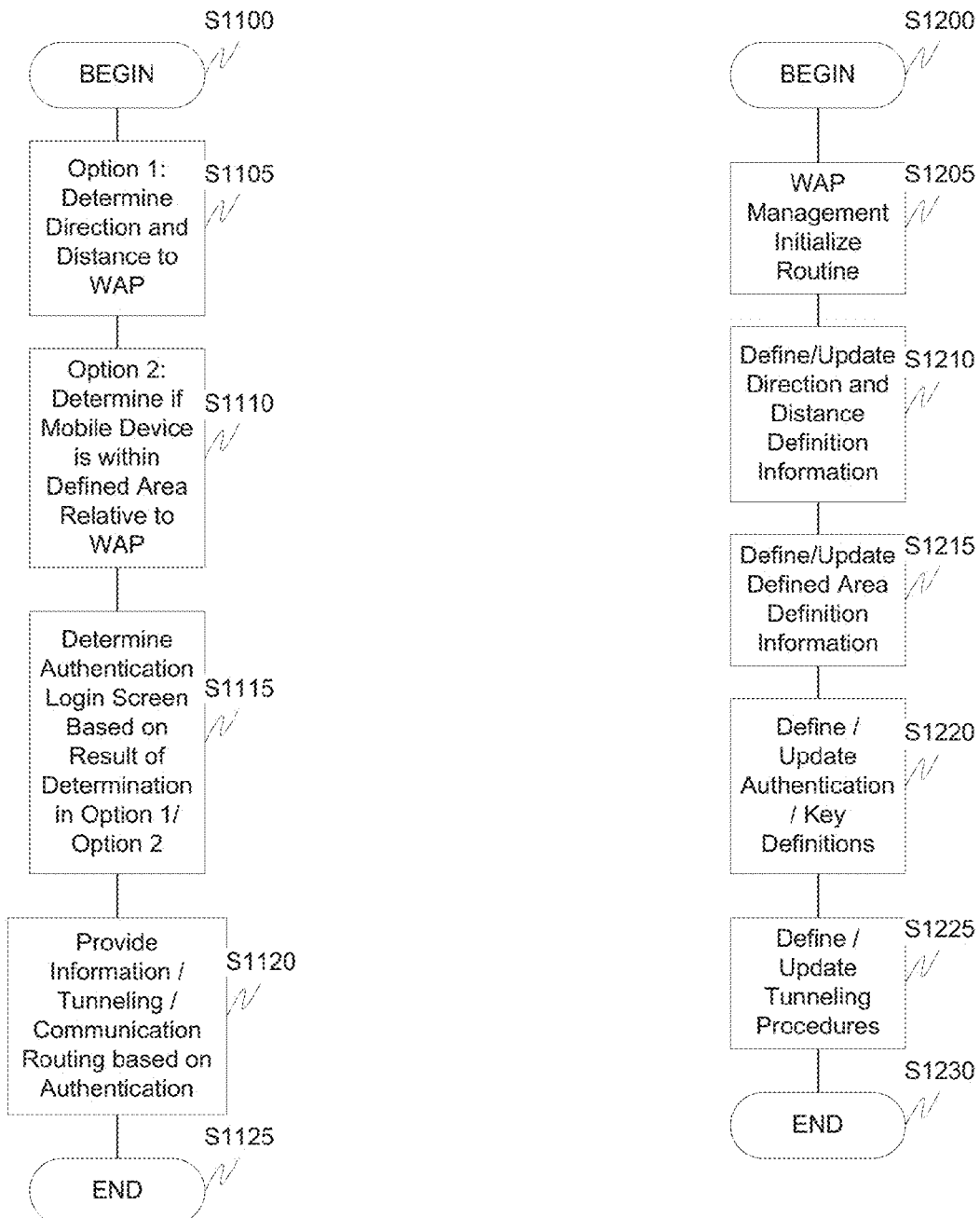

NAVIGATIONAL AID FOR EMERGENCY RESPONSE PERSONNEL

TECHNICAL FIELD

An exemplary aspect relates an emergency response system and associated technologies. More specifically, an exemplary aspect relates to responder access to one or more communications systems. Another exemplary aspect relates to an inference engine for first responders. Still another aspect relates to access point authentication and management for certain class(es) of personnel.

BACKGROUND

U.S. Pat. No. 7,395,047 is directed toward an enhanced emergency system telephone. In particular, when an emergency call is made from a location on a premises that has on-premises (non-public) emergency-response personnel, the communication system responds by accessing a private database of information about the premises, retrieves therefrom information about the location of the physical location on the premises, and best access to the physical location from off-premises, and sends this information to both the on-premises emergency-response personnel and a public emergency-response center, as well as connects the call to the public emergency-response center.

U.S. Pat. No. 7,940,896 is directed toward the adaptation of emergency calls to the emergency services network based on caller location. In particular, this system includes a technique for integrating emergency calling for VOIP users with the legacy emergency services to facilitate adapting to the evolving emergency services network and the services that are available in a given location. Generic location information provided by (or determined for) VOIP emergency callers, typically in civic or geodetic formats, is translated into emergency response locations (ERL) defining an area. The translated location information is conveyed to the PSAP with the emergency call in a form of the ANI or calling line identification number. An appropriate route/gateway is then selected to be used to reach the PSAP appropriate for the caller's location, and an emergency call notification to the appropriate local emergency-response personnel is generated within the enterprise based on the caller's location.

Both of the above patents are incorporated herein by reference in their entirety.

SUMMARY

When a 911 PSAP (Public-Safety Answering Point) receives a call from within a large facility that has its own internal telecommunication network (e.g., their own Avaya® IP Office®, Avaya® Communication Manager system, or the like), it is common for the PSAP, and in turn the first responders, to know the address of the facility and how to get there. One problem is that, in nearly all cases, the PSAP personnel will not have any appreciable knowledge about the internal layout of the facility, the precise location of the emergent event, or current environmental conditions that will almost certainly be a factor in determining the safest way to navigate within the facility to get to and from the emergent event.

In most cases, when a PSAP dispatches personnel to a large facility, information that would be of benefit to the responders already exists in electronic databases that are maintained by the facility. For example, maps and diagrams that show the physical layout of the facility probably already exist someplace in the location's network. A continuously updated database that shows the location and current status of environmental sensors (e.g., smoke, temperature sensors, CO sensors, and the like) could be dynamically created and optionally automatically provided to one or more of the first responders at the emergent event. If the 911 call originated from a wired desktop telephone within the facility, knowledge about the location and the primary user of that telephone can be available from various network repositories. Therefore, one exemplary aspect aggregates one or more portions of this knowledge, and populates this aggregated information in the dynamic database that can be provided to the first responders.

However, another problem is that there is often no need to obtain, coordinate, and analyse the data from all of these different sources until there is an emergency—at which point the ability to figure out what is happening quickly and respond appropriately becomes critical.

The environmental sensor database is not the only source of continuously updated information. Tremendously usable data can be obtained from the facility's Wi-Fi network as well. Consider, for example, the case in which the 911 call originates from a Wi-Fi connected device, perhaps from a person who is moving through the facility. Many Wi-Fi controllers, such as the Aviant® models 8100 and 9100, especially if they are acting in concert and can correlate information, are able to provide the location of Wi-Fi devices in all three planes (x, y and z). With data from a single access point controller, current resolution accuracy can be as precise as three meters. When a fix is obtained using two or more controllers, accuracy can be as granular as in the centimeter range. Where this location identification capability becomes especially interesting, is that it could also allow the Wi-Fi devices of the emergency responders to be tracked as they move through the facility, thereby providing accurate information about their location as well as the originator of the call. This information could also be aggregated and populated in the dynamic database discussed above, and provided to the first responders as needed. The WiFi network could also allow the Wi-Fi devices of the emergency responders to be tracked as they move through the facility. This mechanism could also allow the locations of employees to be tracked, thereby providing yet another source of information about the emergent event. For example, useful inferences might be possible, and additional information might be provided to the responders, if a bunch of employees are observed to be moving away from a specific location, or moving toward a specific location.

One exemplary aspect of the techniques disclosed herein and that it overcomes certain deficiencies with known technologies in terms of collecting and correlating the various pieces of additional data, not related to a device itself, but related to the environment and physical location, analyzing them, and presenting in real-time or near-real-time continuous guidance to emergency responders or other interested parties that have a specific interest in this data.

Illustratively, as is outlined in greater detail herein, one of the user interfaces presented by a responder's Wi-Fi device could resemble the interface presented by a GPS navigational aid that is often used by drivers. Based on the system's knowledge of the facility layout, the 911 caller's location, and the responder's location, the system could direct the responder to the 911 caller's location in much the same way that a GPS system directs drivers to their destination. The system could use its overall knowledge at the facility and of the emergent event(s) to ensure that the navigational guidance provided to the responders does not expose them to avoidable hazards. And, as is true with sophisticated GPS navigational systems that alter their guidance based on changing road conditions, this system could change its guidance in real-time in response to changing conditions at the facility. For example, the system could report: "A temperature sensor along the path that had been recommended to you has just jumped from 75° to 200°. Instead of following that path, turn left in 50 feet and proceed down aisle 23." Consistent with an exemplary embodiment of the proposed techniques, the system could also make recommendations based on intelligent inferences. For example, "A temperature sensor on the floor below the path that had been recommended to you has just jumped from 75° to 200°. Although the temperature sensors along your original path are still showing normal readings, it is recommended that you turn left in 50 feet and proceed down aisle 23 to avoid the potential of floor collapse." (In this example, even though the sensors along the original pathway are still reporting normal readings, an inference was made automatically by the system that a sudden jump in temperature of 125° was due to an event, possibly a fire, which could cause the original pathway to become unsafe suddenly.)

Rutgers University developed a "people finder" application where a person's name, cubicle or telephone number can be entered into a system and the relevant floor plan of that device will be returned with the suggested path to that location from a common entrance point.

However, current conditions within a facility are not taken into account when providing the suggested path. Through a web-based interface, as an example, the name, telephone number, cube number or any other identifying characteristic of an individual can be queried and a "walking path" can be drawn from, for example, the common entrance of the area, to a detailed location on a floor plan. Presently available solutions require the user to know an end point location or the name of the person in trouble, and no real-time information is included or considered in the suggested route. Additionally, no real-time environmental sensor information is collected or considered that may put the responder into further peril by taking a route that contains additional hazardous conditions.

One exemplary aspect utilizes electronic hardware and software components that are typically already installed in a facility and leverages their presence as well as existing internal communication and data networks, to support one or more of the technologies disclosed herein. These components provide some of the infrastructure that allows some of the techniques disclosed herein the ability to maintain and make available, in a suitable electronic form, detailed up-to-date maps and databases that show, for example:

The layout of the facility;
The telephone numbers, locations, and users of all wired telephones within the facility;
The identity and precise location of all Wi-Fi access points within the facility;
The identity and precise location of all devices that are associated with the (respective) Wi-Fi access points;
The location and real-time status of all environmental and motion sensors within the facility;
The locations, quantity and identity of hazardous materials; and
The locations and descriptions of relevant navigational considerations of (e.g., narrow corridors, elevators with size or weight restrictions, stairwells with no access to certain floors, and the like).

One exemplary aspect utilizes the data at least available from one or more of the above sources to provide real-time navigational guidance to emergency responders, allowing them to move quickly to and from emergent events within unfamiliar facilities via pathways that bypass avoidable obstacles and hazards.

Another exemplary aspect is directed toward having an emergency mode that can be triggered, for example, by an abnormal reading from an environmental sensor or the placing of a call from within the facility to an emergency number, either internally or to a 911 PSAP. Aspects of this mode include, as examples:

1. The location and initial assessment of all emergency events could be determined automatically. Note that it is not unusual for emergency situations of different types to occur simultaneously at different locations in a facility.
2. Wi-Fi devices identified as belonging to emergency responders, through, for example, a token or other suitable method of authentication, which might ordinarily require password-protected logins in order to connect to the facility's Wi-Fi access points and specialized databases, could be granted access to all electronic resources that are relevant to the emergent situation, while the emergency condition or situation is active. If no emergent event is in progress, automatic access could be denied, however connectivity could be established through normal authentication schemas.
3. A database could be created that contains information about each of the emergency responders in the facility, such as their names, location, availability, relevant attributes (e.g., speak Spanish, is above/less 200 lbs., is carrying extra oxygen, has HAZMAT training, or the like), and the identity of the Wi-Fi device(s) in their possession.
4. The appropriate responder(s) for each emergency situation could be identified, based on factors such as the responder's attributes and their relative proximity to the emergency situation(s).
5. For each emergency/responder pairing, appropriate navigational guidance, for both ingress and egress to/from the emergency event could be created along with reference to any relevant additional information about the emergency, and relayed to the responder(s).
6. The real-time locations of responders could be tracked as they move through a facility. Navigational updates could be provided to the responders as necessary, via user interfaces that resemble, for example, automotive GPS-based navigational aids that provide guidance to drivers, or other comparable means.
7. The navigational guidance received by responders could visually indicate the location of potential resources in the building such as, for example, fire extinguishers, first aid kits, emergency kits, hydrant points, and the like.
8. The navigational guidance received by responders could be based on situational maps that are updated dynamically and continuously. As an example, "a temperature sensor on the floor below your original pathway has just jumped from 75° to 200°. In 50 ft., turn left and proceed down aisle 23."
9. Centralized monitoring and control of the system can be provided by authorized personnel who may or may not be co-located with the event. Illustratively, an emergency response supervisor could observe a real-time graphical representation of the situation on a monitor, and then have the ability to supplement, modify and/or override the automatic guidance being provided by the system.

10. The system could make inferences about the emergent event based on observing the movements of the emergency-response personnel, as well as input from one or more sensors or other data sources. For example, if a responder is observed to be moving down a recommended pathway, and is then observed to backtrack, inferences could be made about the viability of the original pathway.

11. Responders could carry with them environmental sensors, such as devices that can measure the temperature, noise levels, light levels, carbon monoxide levels, radioactivity levels, or the presence of toxic chemicals, or the like, with the data collected by these sensors being communicable to the system. In addition to making this information available to the responder who is carrying this sensor, the information could be relayed back to a central processor in order to allow a more complete picture of the emergent situation to be created. This also allows the quality of the automated guidance to the responders to be improved as on or more portions of the collected data can be utilized by the inference and to further refine, modify or update recommendations.

12. The system could also store and provide information about employees, e.g., employee names, phone numbers, office locations, current locations (tracked by WiFi or RFID), medical history, and in general, any information pertaining to one or more employees/building occupants.

Another exemplary aspect is directed toward the system maintaining thorough recording or one or more portions of the event, thereby preserving information that could be useful for post-event analysis and training.

Another exemplary aspect if directed toward Wi-Fi devices identified as belonging to emergency responders, through a token or other suitable method of authentication, which might ordinarily require password-protected logins in order to connect to the facility's Wi-Fi access points and specialized data spaces, could be granted access to all electronic resources that are relevant to the emergent situation, while the emergency condition is active. If no emergent event was in progress, automatic access could be denied, however connectivity could continue to be available and established through normal authentication schemas.

Another exemplary aspect is that a database could be created that contains information about each of the emergency responders in the facility, such as their names, location, availability, relevant attributes (e.g., speaks French, has extra oxygen and has radiation sensors), and the identity and nature of the Wi-Fi devise in their possession. By taking into account the responders' attributes and their relative proximity to the emergency situation(s), the system could automatically optimize the assignment and routing of specific responders to specific situations. One exemplary aspect of this technology is that the system has the ability to prioritize the responses in multi-event emergency situations.

In accordance with another exemplary aspect, the system could make inferences about the emergent event based on observing the movements of the emergency-response personnel. For example, if a responder is observed to be moving down a recommended pathway, and then is observed to backtrack, inferences could be made about the viability of the original pathway.

Another exemplary aspect is directed toward navigational guidance received by the responders being usable on digital situational maps that are updated continuously. As part of this process, the system could also make predictions/inferences about how the situation might change and give navigational or other advice based on those predictions. For example, as illustrated in the example above, when a temperature sensor has reported an elevated temperature, the system could recommend an alternative pathway based on an inference or assumption that might jeopardize the original planned route.

Another exemplary aspect is directed toward a subsystem where responders can carry with them environmental sensors, such as devices that can measure the temperature, noise levels, light levels, carbon monoxide levels, radioactivity levels, and the like, or the presence of other toxic chemicals, which could supplement the sensory information provided by fixed-location sensors within the building. In addition to making this information available to the responder who is carrying this sensor, the information could be relayed back to a central processor in order to allow a more complete picture of the emergent situation to be created. This also allows, for example, the quality of the automated guidance to the responders to be improved. Also, as discussed above, this information can be integrated into the dynamic database and provided to one or more destinations.

Another exemplary aspect is directed toward providing real-time navigational guidance to emergency responders, allowing appropriate specialists to move quickly to emergent events within unfamiliar facilities via pathways that bypass avoidable hazards.

These and other exemplary aspects will be described in greater detail with reference to the following detailed description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is another example of an exemplary log in screen of an access point;

FIG. 7 is another exemplary user interface for an access point;

FIG. 11 is a flowchart illustrating an exemplary method for determining an authentication logon screen;

FIG. 12 is a flowchart illustrating an exemplary method for wireless access point management.

DESCRIPTION OF EMBODIMENTS

Figure 1:
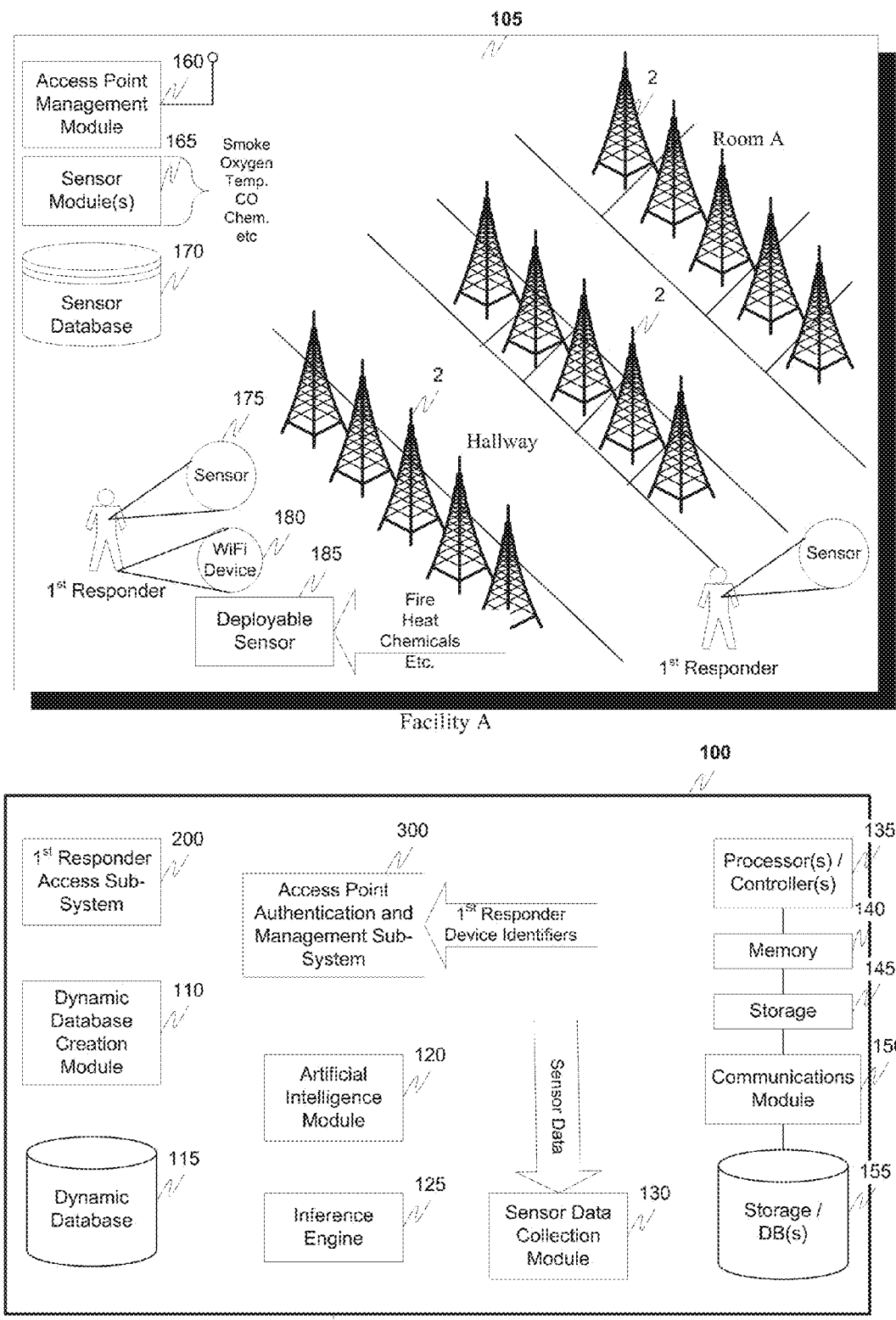
FIG. 1 illustrates an exemplary embodiment of the system disclosed herein.

FIG. 1 illustrates an exemplary access and inference system 100 that is capable of operating with, for example, facility A 105. While certain componentry within the access and inference system 100 and the facility 105 will be described as being associated with a particular system or location, it is to be appreciated that any of the componentry within the access and inference system 100 and/or facility 105 can be rearranged at a different location(s) as well as, for example, partially or fully located with a first responder, such as with an incident management team.

The access and inference system 100 includes a first responder access sub-system 200, a dynamic database creation module 110, a dynamic database 115, an access point authentication and management subsystem 300, an artificial intelligence module 120, an inference engine 125, sensor data collection module 130, one or more processors or controllers 135, memory 140, storage 145, a communications module 150 and one or more databases for storage 155. The access and inference system 100 is connectable via one or more (wired or wireless) links 5 and networks 10, to for example, facility A105 and/or any one or more of the devices therein.

The facility 105 includes an access point management module 160, one or more sensor modules 165, such as smoke sensors, oxygen sensors, temperature sensors, carbon monoxide sensors, chemical sensors, radiation sensors, or the like. The facility 105 further includes a sensor database 170, and this exemplary embodiment includes a plurality of rooms and hallways with one or more associated access points 2. Within the facility, there can be one or more first responders, that can each have associated therewith, one or more sensors 175, a Wi-Fi device(s) 180 and can also carry for deployment, one or more deployable sensors 185.

Figure 2:
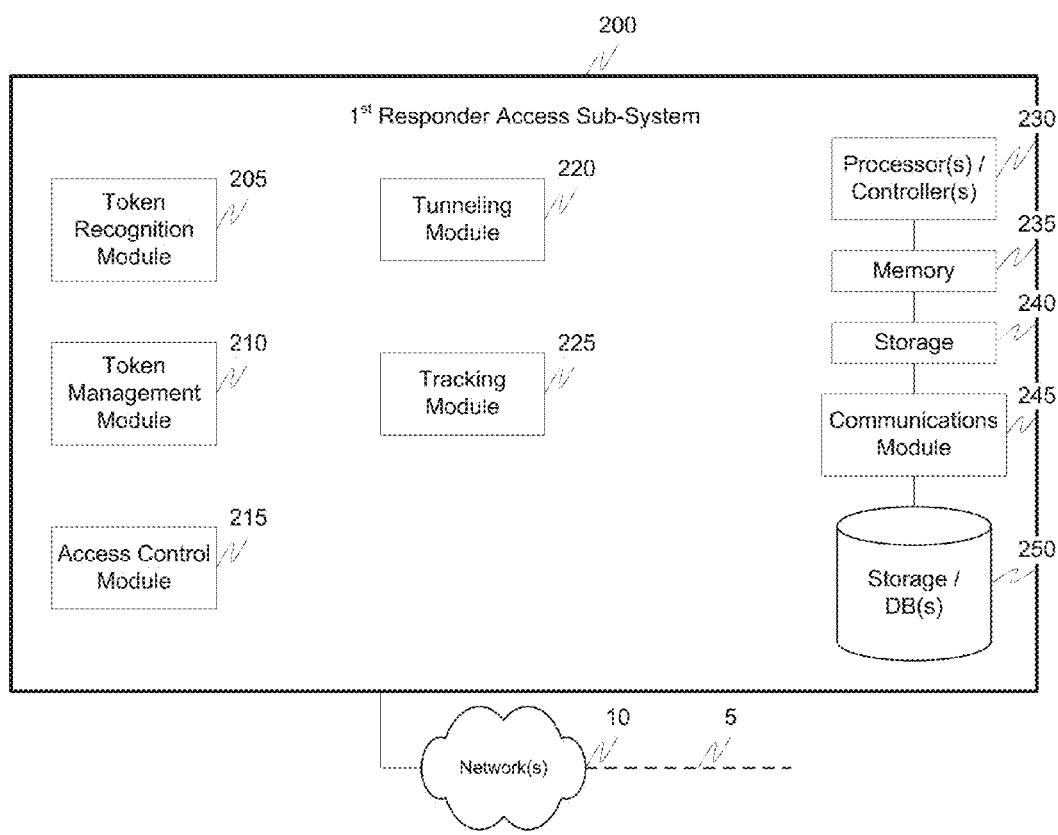
FIG. 2 is a block diagram illustrating exemplary components of a first responder access subsystem.

As illustrated in FIG. 2, the exemplary first responder access subsystem includes a token recognition module 205, a token management module 210, an access control module 215, a tunneling module 220, a tracking module 225, one or more processors 230, memory 235, storage 240, communications module 245, and one or more databases for storage 250. The first responder access subsystem 200 can also be connected via links 5 and networks 10 to one or more other systems/devices.

Figure 3:
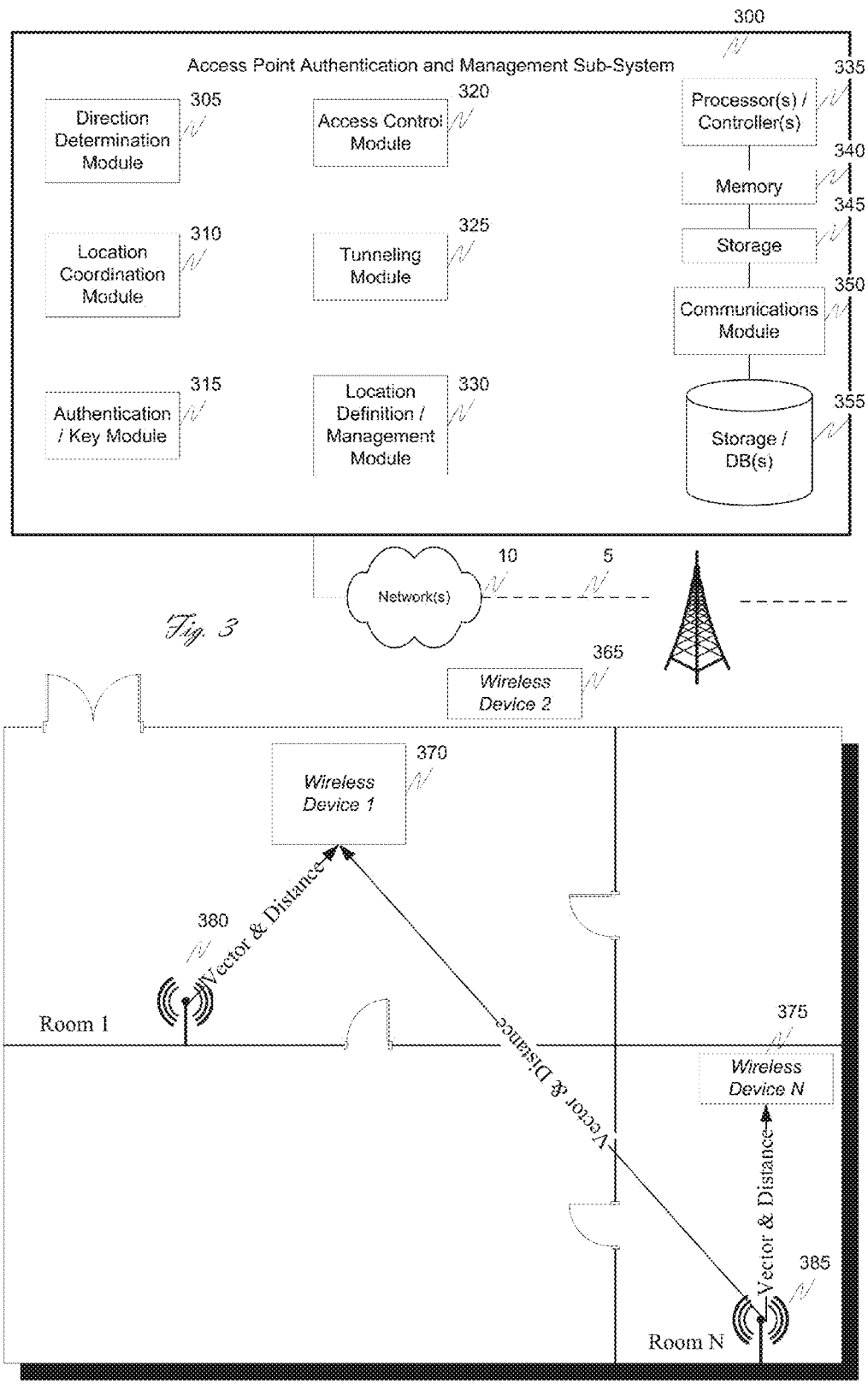
FIG. 3 is a block diagram illustrating exemplary components of an access point authentication and management subsystem.

The exemplary access point authentication and management subsystem 300, as shown in FIG. 3, includes a direction determination module 305, a location coordination module 310, and authentication/key module 315, an access control module 320, a tunneling module 325, a location definition/management module 330, one or more processors 335, memory 340, storage 345, communications module 350, one or more databases for storage 355, and can also be connected via one or more networks 10 and links 5 to other systems/devices.

In accordance with one exemplary embodiment, the first responder access subsystem 200, cooperating with one or more of the elements disclosed herein, is capable of providing, for example, first responders, access to various information at facility A 105. As previously discussed, this information can include static information, such as maps, organizational charts, personnel information, and the like, and can also include dynamic information, such as information received from one or more of the sensors 165/175.

The first responder access subsystem 200, as discussed in greater detail hereinafter, can also cooperate with a dynamic database creation module 110 to create a dynamic database 115, with this dynamic database being accessible and usable by one or more personnel/entities, such as a first responder, to access not only information about facility A, but also information and about the first responders as they are deployed and navigate through facility A to, for example, address an emergent event.

Moreover, and in cooperation with one or more of the artificial intelligence module 120, inference engine 125, sensor data collection module 130, processor 135, memory 140, storage 145, communications module 150 and databases 155, the system can perform an analysis of data received from one or more first responders, such as a path through facility A, and when there is a deviation from a recommended path or a projected path, that data correlated with sensor data received by the sensor data collection module 130 to make an assessment as to whether an inference can be made by the first responder's behavior.

As previously discussed, in accordance with one example, if a first responder is expected to proceed down a first hallway to Room 1A, however deviates from the expected path and instead takes a second hallway and appears to be looking for an alternative access to Room 1A, the inference engine 125 optionally together with the artificial intelligence module 120 can infer that perhaps the normal path to Room 1A is blocked, and the first responder is looking for an alternative access. As previously discussed, this inference can be further substantiated by sensor data received by the sensor data collection module 130 that, for example, confirm smoke, elevated temperatures, fire, a hazardous condition, or the like.

Within the facility 105, there can be an access point management module 160 that allows access point management of the one or more access points 2. Additionally, and as traditionally deployed throughout a facility, there can be one or more wired or wireless sensors such as smoke alarms, oxygen sensors, temperature sensors, fire sensors, or the like. The sensor database 170 can store information regarding, for example, the position of the sensor, the type of sensor, any current or historical readings of the sensor, or in general, any information about the one or more sensors deployed within the facility 105.

As discussed, one of the problems that first responders encounter when they enter a facility, such as facility 105, is they don't have access to the network within the facility, and moreover may not have access or ability to use Wi-Fi since they are unable to authenticate to any of the access points 2. One exemplary embodiment addresses this issue as discussed hereinafter and allows first responders at least partial access to the Wi-Fi system within the facility to facilitate, for example, tracking, and to also allow one or more of a sensor 175 and deployable sensor 185 to communicate with the "outside world" via the facility's existing Wi-Fi infrastructure. This could be especially advantageous in situations where the facility 105 is, for example, an old or substantially steel-reinforced concrete building where it may be difficult to communicate with the outside world from within the facility. Having one or more of the first responder, sensor 175, Wi-Fi device 180, and deployable sensor 185 capable of communication over an existing Wi-Fi network further enhances first responder safety. Moreover, many Wi-Fi controllers, especially if they're acting in concert and can correlate information, are able to provide the location of Wi-Fi devices in all three planes (x, y and z), such that the access points 2 can help track a first responder throughout the facility and also know the location of one or more of the sensor 175, Wi-Fi device 180, and deployable sensor 185. As discussed, this information can optionally be populated in the dynamic database and made accessible to one or more parties.

The dynamic database creation module 110 and dynamic database(s) 115 can be used to assist with not only tracking one or more of the first responder, sensor(s) 175, Wi-Fi device(s) 180 and deployable sensor(s) 185 through facility 105, but as previously discussed can also be connected to one or more systems at facility 105 such as sensor modules 165, sensor database 170, as well as a repository that, for example, holds information such as a facility map, organizational chart, personnel information, or in general any information about the facility and/or employee(s). As previously discussed, this dynamic database creation module 110 can dynamically create the dynamic database 115 upon an emergent event at the facility 105 occurring. For example, as a first responder incident management team arrives at facility A to address an emergent event, the access and inference system 100 can be deployed and connected, via one or more of the networks 10 and links 5, to the existing systems at the facility. The facility can maintain, for example, in a special directory, database, or the like, information that is determined to be relevant to first responders for an emergent event. Information such as maps, personnel information, etc., can be stored in this directory or database and made available to the first responders upon deployment of the access and inference system 100. As will be discussed hereinafter, a token-based or other authentication system can be utilized by the first responders that deploy the access and inference system 100 to gain access to this information optionally, conditionally based on the existence of an emergent event. As will be discussed hereinafter, one exemplary embodiment includes two forms of authentication, the first "authentication" being that there is an emergent event at the facility, and the second authentication being a token, identifier, or other information in the possession of the first responders.

In accordance with another exemplary embodiment, and in cooperation with the artificial intelligence module 120, the artificial intelligence model 120 can cooperate with the dynamic database creation module 110 and any resources available at facility 105 to aggregate information about facility 105 that may be relevant to a first responder. For example, the artificial intelligence module 120, upon the access and inference system 100 being connected to one or more of the systems at facility A, can actively search for information such as maps, personnel information, sprinkler information, sensor information, or the like, and assist with forwarding or routing that information to the dynamic database creation module that can store any relevant information in one or more dynamic databases 115 so that it is available to the first responders. In a similar manner, the artificial intelligence module 120 can cooperate with the access point management module 160 to facilitate accessing one or more of the first responder's sensors 175, Wi-Fi device 180 and deployable sensors 185 within the facility 105. As just one example, the artificial intelligence module 120 can communicate with the access point management module 160 and instruct the access point management module to allow communications over the Wi-Fi network of any one or more of the sensors 175, Wi-Fi devices 180 and deployable sensors 185. This could be accomplished, for example, by the artificial intelligence module 120 forwarding to the access point management module 160 information, such as MAC addresses or other identifiers, associated with one or more of the sensors 175, Wi-Fi devices 180 and deployable sensors 185. Upon receipt of this information, the access point manager module 160 can grant permission for any one or more of the devices discussed herein to communicate via one or more of the access points 2 within the facility 105 and in turn with one or more networks/networked devices.

As will be discussed in greater detail hereinafter, the inference engine 125 can cooperate with one or more of the components of the first responder access subsystem 200 and access point authentication and management subsystem 300 and make inferences based on any information available to the access and inference system 100. As an example, and in cooperation with the tracking module 225, the inference engine can monitor first responder deployment throughout the facility 105. The inference engine 125 can also monitor information such as instructions, maps, guides, or the like, provided to one or more first responder for how to, for example, reach the emergent event within the facility. The inference engine 125, knowing what the projected or expected path to reach the emergent event should be, could then detect if there is a deviation from this trajectory based on information received from the tracking module 225 and first responder Wi-Fi device(s). With this information, inferences could be made and provided to, for example, a display associated with the access and inference system 100 that alerts one or more other first responders that there has been a deviation from the projected or expected path. This information can be coupled with specifics regarding, for example, any anomalies that are detected at one or more of the sensors within the facility or from one or more sensors associated with a first responder, such as sensor 175 or deployable sensor 185. Once the various pieces of information are correlated, the inference can be provided to any party that may be, for example, impacted by the inference such that, for example, "Hallway A is blocked, use Hallway B instead," or the like. This information can be conveyed one or more of graphically, audibly, and visually to, for example, the Wi-Fi device 180 associated with a first responder and/or an incident management team and/or personnel associated with the facility itself. In addition, this information can be displayed or otherwise provided to, for example, an incident management team that is addressing the emergent event.

The inference engine 125 can also cooperate with the artificial intelligence module 120 to assist with controlling one or more emergency response systems within the facility 105. For example, and depending on a particular type of sensed condition, it may not be appropriate to engage the sprinkler system within facility 105. For example, if a certain type of chemical is detected and it is not appropriate to apply water to this type of chemical emergency, the inference engine 125, cooperating with the artificial intelligence module 120, and one or more of the processor 135, memory 140, storage 145, communications module 150 and databases 155, can communicate with one or more systems at facility A, such as a sprinkler system, to ensure the sprinklers are not engaged in the area determined to have the chemical emergency. Since the access and inference system 100 has access to not only information from the sensor modules 165, but also from one or more of the sensors 175 and deployable sensors 185, the access and inference system 100 can accurately assess the scale and scope of, in this example, the chemical emergency and can localize action to the area affected by the chemical emergency.

In general, the inference engine 125 can monitor any aspect of the access and inference system 100 and facility 105 or multiple facilities, and upon a deviation from a "normal" or what is expected activity detected, can perform an analysis and determine whether an inference should be made based on the deviation from the normal, and whether this inference should be provided one or more entities.

The inference engine is also able to utilize historical data to make inferences. As one example, data can be accumulated such as past sensor readings, past path information (such as how people typically traverse from a reception area to room 4D), storage information, inventory information, and the like, and this data used to make inferences regarding a current situation. Additionally, an inference(s) can be used as the basis for determining an additional inference(s).

One example is the following:
Data:
1. Sensor 4C is historically in a normal range.
2. New inventory that contains a hazardous chemical is placed in the vicinity of sensor 4C.
3. Sensor 4B detects a high incidence of the chemical known to be in the vicinity of sensor 4C.
Inference:
The hazardous chemical in the vicinity of sensor 4C may be leaking As another example:
Data:
1. Visitors always take route "A" when going from reception to office B (as tracked by, for example, access points and WiFi).
2. An emergent event is detected at office B.
3. First responders are at the premises.
4. First responders are being tracked within the premises using their WiFi devices.
5. First responders are not taking route "A."
Inference:
Route A must be blocked—recommend alternative route to office B.

As another example:
Data/Inference:
1. A 911 call is detected in region A but the call provides no information about the nature of the emergency.
2. None of the environmental sensors in region A are reporting an abnormal reading.
3. It is known by the system, via its secure access to corporate medical records, that an employee in region A has diabetes and has had prior incidents of hypoglycemia and hyperglycemia that required prompt attention. One problem is that, due to HIPAA regulations that require confidential medical information to be protected, transmission of potentially relevant information about this specific employee cannot be presented to the first responders prior to their arrival at the scene because it's not known whether a diabetic crisis with this employee is what triggered the 911 call.
4. Based on its access to historical data and confidential medical records, and on the fact that all environment sensors are reporting normal levels, the system infers that a diabetic episode is a plausible (if not likely) reason for the 911 call. Without revealing any information that would be protected by HIPAA guidelines, the system could advise the first responders to ensure that they are bringing insulin, glucose, and a glucometer with them, and that they will not need to bring fire suppression equipment.

As another example:
Data:
1. Sensor 1 detects smoke.
2. Sensor 2 detects chemicals.
3. First responder "Fireman 12" has not communicated with incident management team.
Inference:
Fireman 12 may need assistance.
Data:
4. Fireman 12 bioinformatics show low oxygen levels.
5. Fireman 12 may need assistance.
Inference:
Fireman 12 may have been exposed to detected chemicals.

FIG. 2 illustrates in greater detail the first responder access sub-system 200. In general, the first responder access sub-system facilitates access to a facility's network and/or access points for one or more first responders. The first responder access sub-system 200 can cooperate with, for example, the access point management module 160 at the facility 105 to assist with enabling access to the Wi-Fi and/or other communications network(s) at the facility 105. More specifically, and in operation, the token management module 210 allows the creation of one or more tokens or other identifiers that indicate that a particular Wi-Fi device is associated with one or more first responders. As previously discussed, this token or other identifier can be used as a first form of authentication to confirm that the Wi-Fi device is associated with a first responder and as discussed hereinafter will allow them one or more of access to certain information on a network associated with facility 105 and/or limited use of Wi-Fi access points within the facility. Thus, as first responders are deployed at a facility, any wireless device associated with the first responders can include an associated token or identifier that is usable by the token recognition module 205 and access control module 215 to provide access to the Wi-Fi network at the facility 105. Thus, when a first responder is deployed, the access point management module 160 communicates with the token recognition module 205 to confirm that the token or other identifier is a valid first responder token or identifier, and with the cooperation of the access control module 215, an instruction sent to the access point management module 160 instructing the access point management module 160 that the token or identifier is valid, and use of the Wi-Fi network should be granted. As will be appreciated, for security reasons, access to the Wi-Fi network could be limited to certain types of communication. For example, access to the Wi-Fi network could be limited utilizing the tunneling module 220. The tunneling module 220 cooperates with the access point management module 160 to assist with setting up the necessary configurations that allow the first responder Wi-Fi devices to communicate via the facility Wi-Fi network. For example, the tunneling module 220 can cooperate with the access point management module 160 to communicate any necessary protocol, port, or other communication information to the access point management module 160 to help ensure that any Wi-Fi communications devices associated with a first responder are able to use the access points 2.

As previously discussed, once the first responders' Wi-Fi devices have access to the Wi-Fi network, the tracking module 225 can track via one or more of the Wi-Fi devices 180 of the first responder and sensors 175/185 within the facility 105, with this information relayable back to the access and inference system 100.

Using the tunneling module 220 and cooperating with the access point management module 160, first responders can be granted access to communications and information that is pertinent to the emergent even, while protecting sensitive information at facility A. Moreover, another exemplary advantage of the first responder access sub-system 200 is that first responders and their associated equipment can rely on existing communications infrastructure for communication which can be particularly advantageous in buildings where normal wireless communications, such as cell communications and radio communications, may not work or may not work well.

FIG. 3 illustrates an exemplary embodiment of the access point authentication and management subsystem 300. The access point authentication and management sub-system 300 can further be used to assist with obtaining access to, for example, a Wi-Fi or other wireless communications network. In particular, the access point authentication and management sub-system 300 can work within an exemplary environment 360 as shown in FIG. 3. The exemplary environment 360 includes a plurality of rooms, and a plurality of wireless devices, such as wireless device 1 370, wireless device 2 365 and wireless device N 375.

In this exemplary embodiment, room 1 includes an access point 380 and room N includes an access point 385. In accordance with one exemplary operational embodiment of the access point authentication and management sub-system 300, authentication to an access point can at least partially be governed by the location of the wireless device relative to one or more access points. As previously discussed, most access points are capable of determining a location of a wireless device relative to the access point, with the access point knowing vector and distance information regarding the wireless device relative to the access point. As also discussed, when two or more access points cooperate, the access points are able to determine very granularly a precise location of a wireless device relative to those two access points. As will be discussed in greater detail and hereinafter, that location information can be used to one or more of provide different types of access, provide different types of authentication or logon screens to the wireless device and/or be used as authentication or partial authentication for access to the wireless network.

More particularly, the location definition/management module 330 can be used to define one or more geographic areas (optionally in the x, y, and z dimensions) relative to one or more access points. In accordance with one exemplary embodiment illustrated in FIG. 3, location definition/management module 330 can be programmed with information that defines room 1 as well as room N. Additionally, the location definition/management module 330 can be programmed to indicate that wireless device 2 365 is outside of the environment 360. Thus, the location of a device, such as wireless device 1 370, relative to one or more of the access points 380 and 385 can be determined with the cooperation of the direction determination module 305 and the location coordination module 310. As discussed, this location information can be usable by the authentication/key module 315 as one factor of authentication for access to the wireless network associated with one or more of the access points 380/385. And more specifically, assume that within environment 360, room 1 is a reception area and room N is an office. The location outside the environment 360 where wireless device 2 is located is a parking lot. In this exemplary scenario, access to certain information is provided to the Wi-Fi device that is present within room N, that information not being available to any device outside of the environment 360. For wireless device 1 370, presence within the environment 360 may provide access to that same information, however only upon a second factor of authentication being provided, such as a login credential. If, for example, that login credential is not in the possession of the entity associated with wireless device 1, certain information could alternatively be presented to wireless device 1, such as advertising information, a unique login screen, or the like, upon that wireless device 1 370 trying to authenticate to the wireless network associated with one or more of the access points 380/385. As will be discussed hereinafter in greater detail, there are numerous variations of how vector and distance information can be usable to manipulate what information is provided to for what information a wireless device has access to.

In accordance with another exemplary embodiment, again utilizing the scenario described above in relation to the environment 360, and in cooperation with the tunneling module 325 and one or more of processors 335, memory 340, storage 345, communications module 350 and databases 355, the wireless device 1 370, determined to be in the reception area of environment 360 by the direction of determination module 305 and location coordination module 310, can be provided a tunnel such that the wireless device can communicate via one or more of the access points 380/385 with the internet. However, any private information associated with the internal or intranet associated with environment 360 is not available to the wireless device 1370.

In contrast, wireless device N 375, being located within room N, and optionally providing a second factor of authentication such as a login ID and password, would be provided wireless access to not only the internet, but also any intranet associated with the environment 360. If, however, the wireless device N 375 were to move outside the environment 360, such as adjacent to wireless device 365, one or more of the access points 380/385 could detect this change of location and terminate the ability for the wireless device N 375 to communicate via one or more of the access points 380/385.

As yet another alternative, upon wireless device 2 365 trying to access the wireless network associated with one or more of the access points 380/385, an advertisement for the business associated with environment 360 could be provided to the wireless device 2 365 as opposed to an authentication or login screen. For example, as illustrated in FIGS. 4-7, exemplary user interfaces presented to a wireless device for some of the above scenarios are shown.

Figure 4:
FIG. 4 is an exemplary authentication screen.
Figure 5:
FIG. 5 is a second example of an exemplary authentication screen.

More specifically, as illustrated in FIG. 4, this particular exemplary interface could be presented to wireless device 1 370 upon wireless device 1 trying to authenticate to the wireless network. Here, a welcome to Avaya® message is presented with an option for the user associated with wireless device 1 to access the internet (using the selectable link) via the tunneling protocol as discussed above. However, as illustrated in FIG. 5, an exemplary interface 410 as shown it could be presented to wireless device N 375 upon that wireless device trying to authenticate to the wireless network. Here, since the wireless device N was determined to be within room N, a company login screen can be provided with user ID and password fields, as well as the ability to perform a search and access a company directory.

As yet another example, and as previously discussed, since access points can determine with granularity the location of a wireless device within an environment and/or relative to a particular access point(s), this location information can be usable to, for example, provide targeted information, such as advertising, to the wireless device. As illustrated in FIGS. 6 and 7, different information is provided to the wireless device upon the wireless device trying to authenticate with a wireless network based on where the wireless network device is determined to be located. For example, in FIG. 6 is shown an exemplary interface 610 that is provided to a wireless device when the wireless device is in a grocery section of a megamart. However, as the device moves to the electronics and music section of the megamart, interface 710 could be provided through the wireless device with information about today's electronics and music specials provided to the user. Therefore, in general, and in cooperation with the location coordination module 310, certain information can be associated with one or more specific locations of the wireless device. Then, as the wireless device attempts to authenticate with the wireless network, that information can be provided to the wireless device, optionally in lieu of any type of traditional login or authentication screen.

As another example, the tokens can also be used by the first responders to secure access to medical records of a patient on the premises. For example, if a 911 call originates from Pat, the system can make Pat's medical records available to a first responder who presents a token indicting that they are a first responder, that they are a paramedic, and that an emergent event is present based on the detected 911 call. Thus, as the first responder arrives at the facility, the first responder is provided access to the network and/or dynamic database with the medical records for Pat. Thus, the 3 factors of authentication to access the medical records for Pat are: 1) identification of first responder, 2) paramedic credentials, and 3) detection of a emergent event. As discussed, these 3 factors could provide access via a first responder's WiFi device to the facilities network and thus the medical records of Pat and Pat's location within the facility—with optionally no other information about the facility or the facilities employees being available to the first responder.

Figure 8:
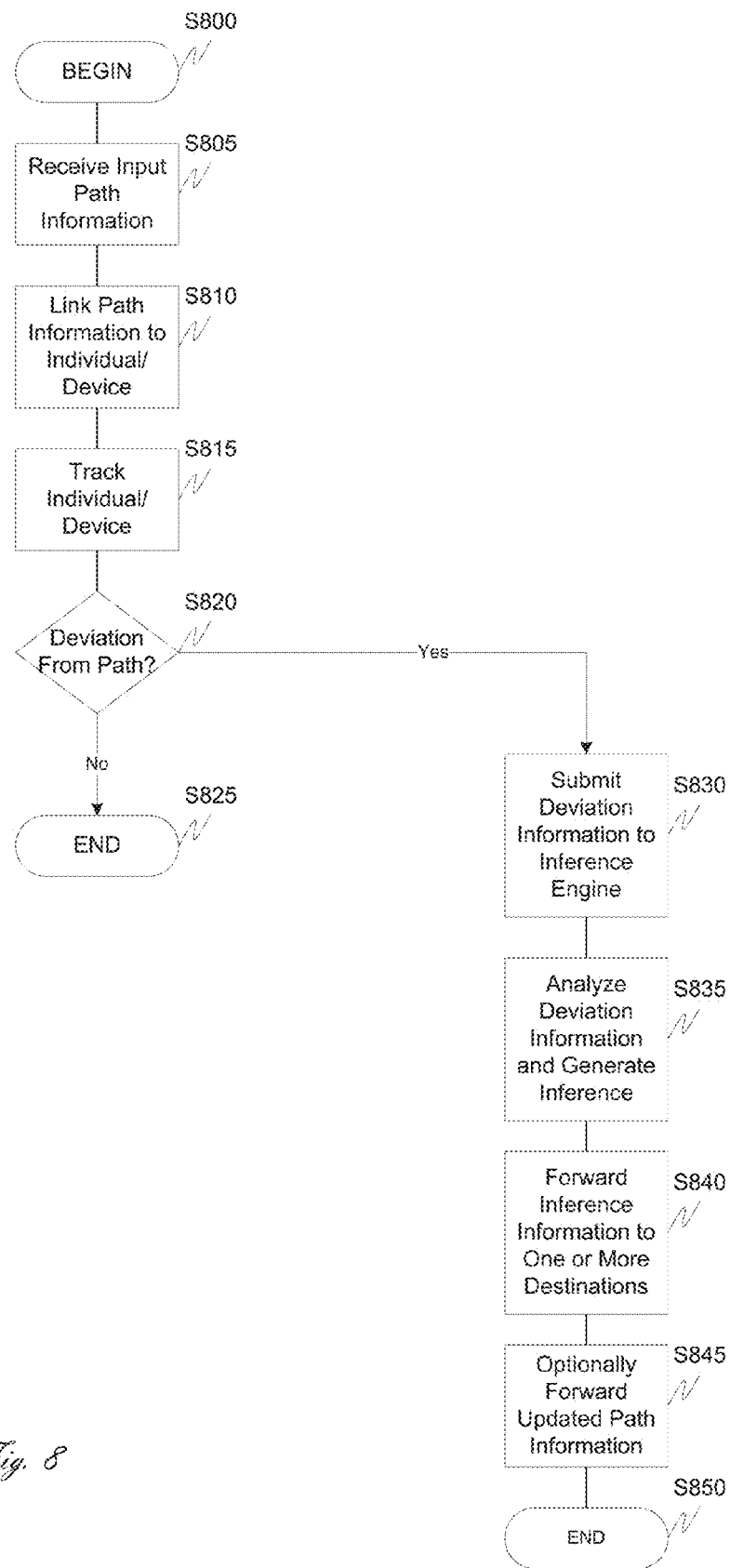
FIG. 8 is a flowchart illustrating an exemplary method of generating an inference.

FIG. 8 is a flowchart outlining an exemplary method for inference determination. In particular, control begins in step S800 and continues to step S805. In step S805, input path information is received. Next, in step S810, path information is associated with a particular individual/device. For example, if first responder X was told to proceed a certain path to an emergent event, these activities are associated in step S810. Then, in step S815, the individual is tracked using their Wi-Fi device through, for example, a facility. Control then continues to step S820.

In step S820, a determination is made as to whether a deviation from an expected path has been detected. If there is no deviation, control continues to step S825 where the control sequence ends. However, if there is a deviation, control jumps to step S830.

In step S830, information regarding the deviation is submitted to the inference engine. Next, in step S835, this deviation information is analyzed optionally in conjunction with one or more other pieces of information, such as available sensor data, to generate an inference regarding the deviation. Then, in step S840, the generated inference, the generated inference is forwarded to one or more destinations as discussed herein. Control then continues to step S845.

In step S845, based on the generated inference, updated path and/or other information can be forwarded to one or more wireless devices. Control then continues to step S850 where the control sequence ends.

While the exemplary inference engine operation has been discussed in relation to path information, it is to be appreciated that an inference(s) can be made regarding any information available to the system from one or more sources. Other examples include inferences about appropriate equipment, inferences about appropriate manpower, inferences about safety, inferences about costs, inferences about estimates for completion times, and/or in general any inference about anything and/or any person.

Figure 9:
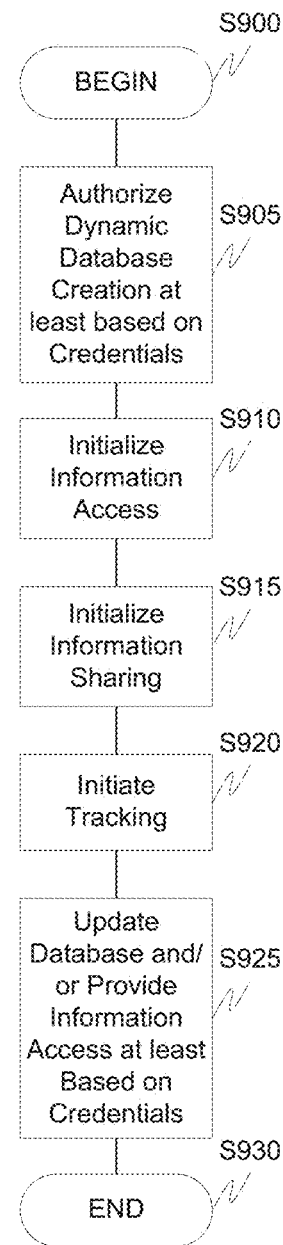
FIG. 9 is a flowchart illustrating an exemplary method for dynamic database creation and tracking.

FIG. 9 illustrates an exemplary method for dynamic database creation. In particular, control begins in step S900 and continues to step S905. In step S905, the dynamic database is authorized to be created optionally based upon one or more credentials. Next, in step S910, certain types of informational access are made available to the dynamic database, such as facility maps, personnel information, and the like. Then, in step S915, information sharing is initialized such that, for example, the event management team then have an aggregated source of information about, not only their first responders, but also the facility experiencing the emergent event. Control then continues to step S920.

In step S920, tracking can optionally be initiated. This tracking information is optionally usable as a factor of authentication. For example, as discussed above, if it is determined that a wireless device is within a certain geographic area, geofence, geoboundry, or the like, access to the dynamic database may be enabled. However, if the wireless device leaves a particular area, geofence, geoboundry, or the like, access to the dynamic database may be limited, or prohibited. As such, in step S925, information can be provided and/or the database updated based on one or more credentials, location information, or other authentication information as appropriate. Control then continues to step S930 where the control sequence ends.

Figure 10:
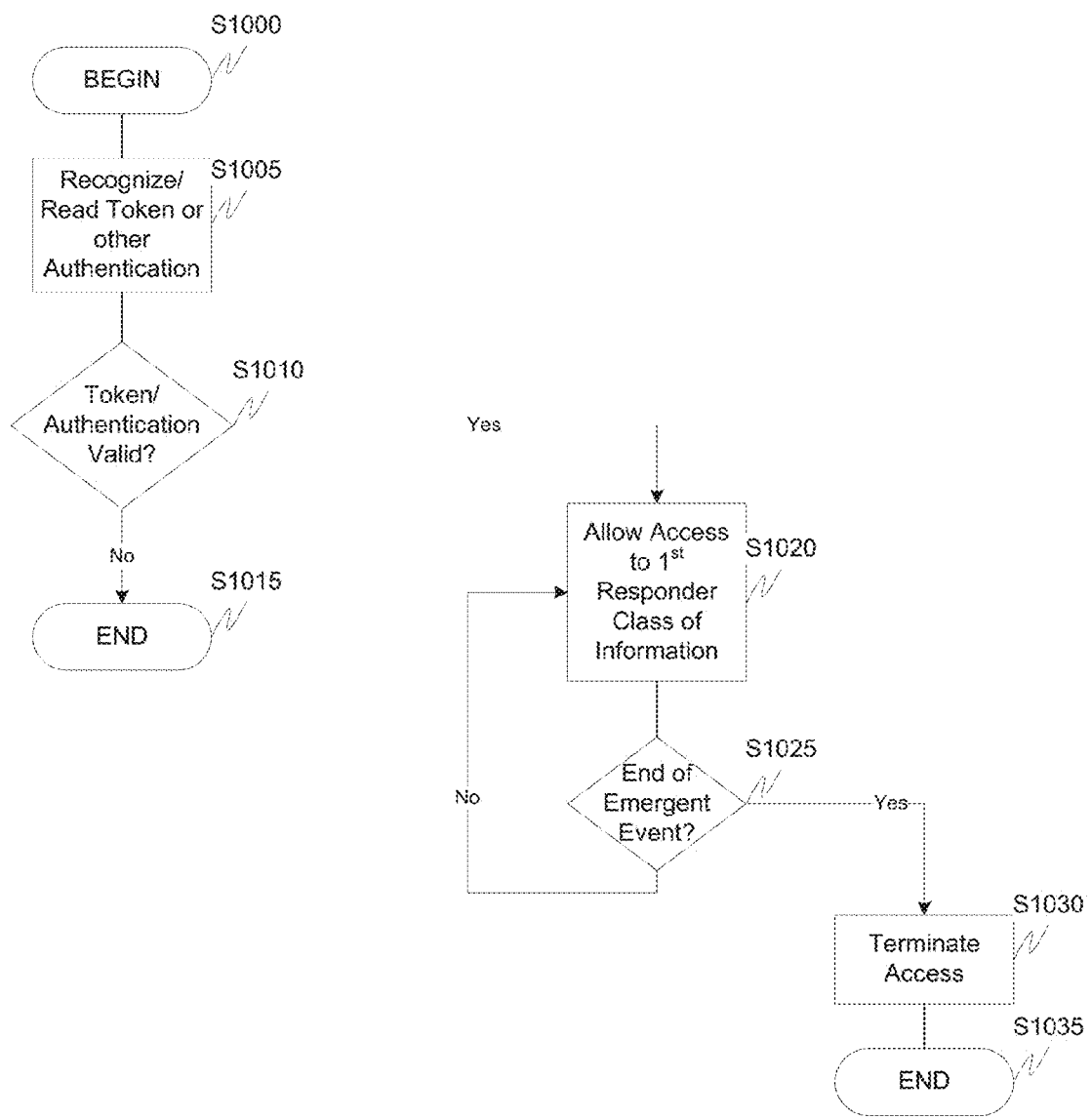
FIG. 10 is a flowchart illustrating an exemplary method for a first responder to access information.

FIG. 10 illustrates an exemplary method of token recognition. In particular, control begins with step S1000 and continues to step S1005. In step S1005, token or other identification authentication information is recognized and/or read. A determination is then made as to whether the token/authentication is valid. If the token/authentication is not valid, control continues to step S1015 where the control sequence ends. Otherwise, control jumps from step S1010 to step S1020.

In step S1020, access is provided to a certain class or categories of information. As previously discussed, first responders, based on the authentication of this token, could be granted access to certain types of information at a facility, such as maps, personnel directories, sensor information, or in general any type of information that may assist with addressing an emergent event. Next, in step S1025, a determination is made as to whether the emergent event has ended. If the emergent has not ended, control jumps back to step S1020 where, for example, the first responder continues to have access to necessary information. However, if the emergent event has ended, control jumps to step S1030 where access to the information in terminated. Control then continues to step S1035 where the control sequence ends.

While exemplary embodiments discussed here and are directed toward embodiments where first responders and emergent events are present, it should be appreciated that the techniques and methodologies discussed herein could be extended to any type of environment, type of personnel and/or environment and all such extensions and modifications are within the scope of the present disclosure.

FIG. 11 outlines an exemplary method for modifying a login screen based on a wireless device's location. In particular, control begins in step S1100 and continues to step S1105. In step S1105, and as a first option, direction and distance to a wireless access point are determined. Next, in step S1110, and as a second option, it is determined whether the mobile device is within a defined area relative to a wireless access point. Then, in step S1115, an authentication login screen is determined based on the results of one or more of option 1 in step S1105 and in option 2 in step S1110. Control then continues to step S1120.

In step S1120, one or more of a specific login screen, specific tunneling protocol, and/or specific communication routing is provided to the wireless device based on the result of the determining step S1115. For example, and as discussed, certain information can be provided to the wireless device if it is within a first area, but different information provided if the device is in a second area. As further illustrated herein, type of access provided can be dynamically adjusted based on whether a device is in a first area or a second area. As described herein, in one example, if a device is within a reception area, access to the internet is provided, however no other access to the Wi-Fi network is available to the wireless device. However, if it is determined that the wireless device is within an office of the environment, full access to an intranet could be provided. Control then continues to step S1125 where the control sequence ends.

FIG. 12 illustrates an exemplary method for wireless access point management. In particular, control begins in step S1200 and continues to step S1205. In step S1205, wireless access point management initialization routine is started. Next, in step S1210, one or more of direction and distance definition information can be defined and/or updated. Next, in step S1215, one or more defined area definition information can be defined and/or updated. Control then continues to step S1220.

In step S1220, and in conjunction with one or more of the distance definition information and defined area definition information certain types of authentications/key definitions can be assigned to those distance definitions and defined areas. For example, and as previously discussed, if a wireless device is within a certain defined area, certain types of log in screens and/or information are presented. However, if the wireless device is in a different area, other types of information may be provided with or without a login screen. Control then continues to step S1225.

In step S1225, optionally tunneling procedures can also be defined based on one or more of the distance definition information and defined area definition information. As previously discussed, if a user is, for example, at a certain location relative to an access point, the user may be provided tunneling access to the internet, however no access to an intranet or the information stored therein. This can be optionally overridden by a certain type of login and authentication, using, for example, a user ID and password, and/or a direction and distance definition and/or the defined area definition information. While location information can be used as an "absolute rule" governing access, there can be an option of overriding the operation of an access point if a wireless device is within that specific area and/or distance or direction and the appropriate authenticating factor(s) is provided. Control then continues to step S1230 where the control sequence ends.

Figure 13:
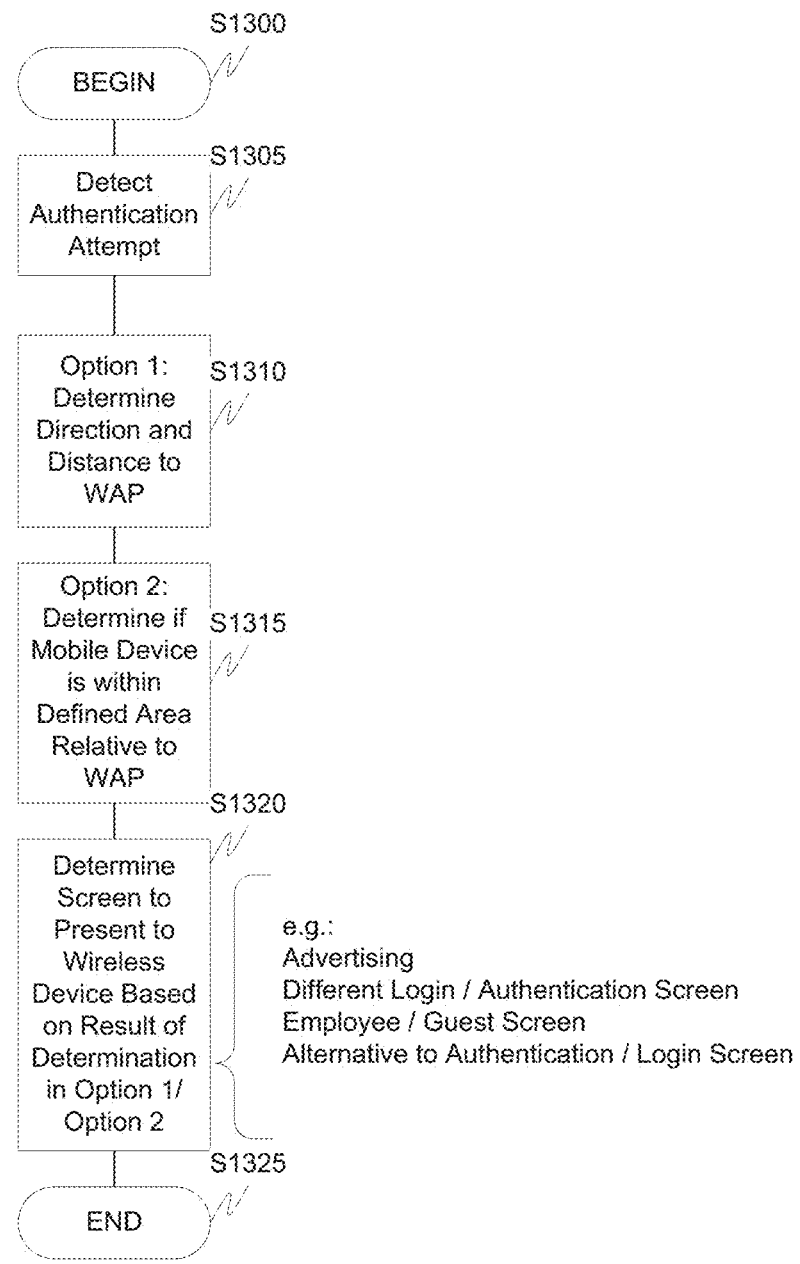
FIG. 13 is a flowchart illustrating an exemplary method for determining which screen to present to a user when accessing a wireless access point.

FIG. 13 outlines an exemplary method for providing different information to a wireless device based on its location. In particular, control begins in step S1300 and continues to step S1305. In step S1305, an authentication attempt is detected. Next, in optional step S1310, a direction and distance to the wireless access point is determined. Optionally, in step S1315, it is determined whether the mobile device is within a defined area relative to the wireless access point. Control then continues to step S1320. In step S1320, it is determined which information to present to the wireless device based on the result of the determination in one or more of option 1 and option 2. As discussed, this different type of information can be, for example, advertising, different login and/or authentication screens, an employee vs. a guest screen, an alternative to an authentication or login screen, or the like. Control then continues to step S1325 where the control sequence ends.

In accordance with an optional embodiment, the first responder WiFi device includes one or more displays, a controller/processor, memory, transceiver and other well-known componentry. The device is adapted to receive at least one or more of the inferences and other information herein. As will be appreciated the inferences and information can be presented one or more of audibly and graphically to the first responder.

Additionally, while the description has been described in relation to first responders, it is to be appreciated the technology herein can be utilized in any environment with any type of personnel.

While all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used in other flowcharts illustrated herein.

In the following detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same.

It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network.

Thus, it should be appreciated that the components of the system can be combined into one or more devices, or split between devices, a node or collocated on a particular node of a distributed network, such as a communications network. As will be appreciated from the following description, and for reasons of computational efficiency, the components of the system can be arranged at any location within a distributed network without affecting the operation thereof. Similarly, one or more of the functional portions of the system could be distributed between a device, such as a computing device and/or server(s) and/or computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

It should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to 802.11 (WiFi) transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show some of the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a telecommunications network. As will be appreciated from the following description, and for reasons of computational efficiency, the components of the system can be arranged at any location within a distributed network without affecting the operation of the system.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver(s) and associated network, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications/computing system.

It is therefore apparent that there has been provided systems and methods for first responder access and inference determination. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A system comprising:
a wireless network access point;
a direction determination module connected to a processor, memory and the wireless network access point, the direction determination module determining a location of a wireless device;
an access control module, connected to the processor and memory, that provides specific information to the wireless device based on the determined location of the wireless device; and
a dynamic database, the dynamic database created upon an emergent event at a facility being detected, the dynamic database at least populated with aggregated sensor information, facility information and information about one or more first responders in the facility where the emergent event is occurring, the dynamic database being accessible by one or more of the wireless device and one or more of the one or more first responders in the facility, wherein access to the dynamic database by the wireless device depends on the determined location of the wireless device.

2. The system of claim 1, wherein specific information is provided to the wireless device on a predetermined login screen.

3. The system of claim 2, wherein the specific information is one or more of maps and diagrams of a facility.

4. The system of claim 1, wherein specific information is provided to the wireless device and the specific information is location-based sensor information.

5. The system of claim 1, further comprising a location definition module in communication with the processor to receive information defining one or more areas, the one or more areas being correlated to specific information provided to the wireless device.

6. The system of claim 1, further comprising a location coordination module in communication with the processor to coordinate location information between two or more wireless network access points.

7. The system of claim 1, wherein the location is used by the access control module as an additional factor of authentication to a network.

8. The system of claim 7, wherein the dynamic database is further populated with information from one or more Wi-Fi networks at the facility.

9. The system of claim 1, further comprising a tunneling module in communication with the processor to control access to a network based on the determined location of the wireless device.

10. The system of claim 1, further comprising an environmental sensor database that is continuously updated based on information from one or more sensors in the facility.

11. A method comprising:
providing a wireless network access point;
determining, by the wireless network access point, a location of a wireless device;
providing specific information to the wireless device based on the determined location of the wireless device; and
creating a dynamic database upon an emergent event at a facility being detected, the dynamic database at least populated with aggregated sensor information, facility information and information about one or more first responders in the facility where the emergent event is occurring, the dynamic database being accessible by one or more of the wireless device and one or more of the one or more first responders in the facility, wherein access to the dynamic database by the wireless device depends on the determined location of the wireless device.

12. The method of claim 11, wherein specific information is provided to the wireless device on a predetermined login screen.

13. The method of claim 12, wherein the specific information is one or more of maps and diagrams of a facility.

14. The method of claim 11, wherein specific information is provided to the wireless device and the specific information is location-based sensor information.

15. The method of claim 11, further comprising receiving information defining one or more areas, the one or more areas being correlated to the specific information provided to the wireless device.

16. The method of claim 11, further comprising coordinating location information between two or more wireless network access points.

17. The method of claim 11, wherein the location is used by the access control module as an additional factor of authentication to a network.

18. The method of claim 17, wherein the dynamic database is further populated with information from one or more Wi-Fi networks at the facility.

19. The method of claim 11, further comprising controlling access to a network based on the determined location of the wireless device.

20. The method of claim 13, further comprising updating an environmental sensor database based on information from one or more sensors in the facility.

21. The system of claim 10, wherein the sensors are one or more of smoke sensors, temperature sensors, oxygen sensors, CO sensors and fire sensors and the facility information includes one or more of fire extinguishers, first aid kits, emergency kits, and hydrant points.

* * * * *